(12) United States Patent
Horie et al.

(10) Patent No.: US 8,695,812 B2
(45) Date of Patent: *Apr. 15, 2014

(54) WATER-PROOF SOUND-TRANSMITTING MEMBRANE, METHOD FOR PRODUCING WATER-PROOF SOUND-TRANSMITTING MEMBRANE, AND ELECTRICAL APPLIANCE USING THE MEMBRANE

(75) Inventors: Yuri Horie, Osaka (JP); Kouji Furuuchi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/669,305

(22) PCT Filed: Jul. 11, 2008

(86) PCT No.: PCT/JP2008/062607
§ 371 (c)(1),
(2), (4) Date: Jan. 15, 2010

(87) PCT Pub. No.: WO2009/011315
PCT Pub. Date: Jan. 22, 2009

(65) Prior Publication Data
US 2010/0206660 A1     Aug. 19, 2010

(30) Foreign Application Priority Data
Jul. 18, 2007   (JP) .................. 2007-187423

(51) Int. Cl.
*B01D 39/00*  (2006.01)
*B01D 29/00*  (2006.01)
*G10K 11/00*  (2006.01)

(52) U.S. Cl.
USPC ...... 210/500.36; 210/490; 181/175; 181/167; 156/229

(58) Field of Classification Search
USPC ........ 210/500.36, 490; 428/311.51, 319, 364, 428/219; 181/175, 167, 150; 156/229; 29/514; 381/86, 355; 264/288.8
See application file for complete search history.

(56) References Cited

U.S. PATENT DOCUMENTS

| 4,385,093 | A |   | 5/1983  | Hubis |
| 5,225,131 | A | * | 7/1993  | Tamaru et al. ............... 264/113 |
| 5,488,766 | A |   | 2/1996  | Gerry et al. |
| 5,814,405 | A | * | 9/1998  | Branca et al. ........... 428/311.51 |
| 5,828,012 | A |   | 10/1998 | Repolle et al. |
| 5,834,528 | A |   | 11/1998 | Tanaka et al. |
| 6,261,979 | B1 |  | 7/2001  | Tanaka et al. |
| 6,262,979 | B1 | * | 7/2001  | Anderson et al. ............. 370/267 |
| 6,302,934 | B1 |  | 10/2001 | Nabata et al. |
| 6,487,977 | B1 | * | 12/2002 | Williams et al. .......... 108/50.12 |

(Continued)

FOREIGN PATENT DOCUMENTS

| EP | 2174778 | * | 4/2010 |
| JP | 53-085865 |   | 7/1978 |

(Continued)

*Primary Examiner* — Ana Fortuna
(74) *Attorney, Agent, or Firm* — Hamre, Schumann, Mueller & Larson, P.C.

(57) ABSTRACT

A water-proof sound-transmitting membrane 10 includes a polytetrafluoroethylene porous membrane 1 and has a surface density of 1 to 20 g/m². The polytetrafluoroethylene porous membrane 1 includes a first porous layer 1a, and a second porous layer 1b stacked on and integrated with the first porous layer 1a by a binding force acting between polytetrafluoroethylene matrices.

7 Claims, 6 Drawing Sheets

(56) References Cited

U.S. PATENT DOCUMENTS

| | | | |
|---|---|---|---|
| 6,491,867 B1 * | 12/2002 | Lee et al. | 420/422 |
| 6,512,834 B1 | 1/2003 | Banter et al. | |
| 7,147,744 B2 * | 12/2006 | Kaz et al. | 156/279 |
| 7,342,793 B2 | 3/2008 | Ristic-Lehmann et al. | |
| 8,141,678 B2 * | 3/2012 | Ikeyama et al. | 181/175 |
| 8,226,864 B2 | 7/2012 | Wano et al. | |
| 8,272,513 B1 | 9/2012 | Leventhal | |
| 8,272,517 B2 | 9/2012 | Horie et al. | |
| 2005/0018864 A1 | 1/2005 | Minervini | |
| 2009/0061205 A1 | 3/2009 | Hokazono et al. | |
| 2010/0206660 A1 * | 8/2010 | Horie et al. | 181/175 |
| 2011/0143114 A1 * | 6/2011 | Horie et al. | 428/219 |
| 2011/0143118 A1 | 6/2011 | Loro Piana | |
| 2011/0255728 A1 * | 10/2011 | Abe et al. | 381/355 |
| 2013/0084447 A1 * | 4/2013 | Shimatani | 428/220 |
| 2013/0156985 A1 * | 6/2013 | Karube et al. | 428/41.8 |

FOREIGN PATENT DOCUMENTS

| | | | |
|---|---|---|---|
| JP | 54-097686 | | 8/1979 |
| JP | 57-131236 | | 8/1982 |
| JP | 5-185506 | A | 7/1993 |
| JP | 5-214140 | | 8/1993 |
| JP | 7-502940 | A | 3/1995 |
| JP | 7-292144 | A | 11/1995 |
| JP | 10-511307 | A | 11/1998 |
| JP | 11-501973 | | 2/1999 |
| JP | 2003-053872 | A | 2/2003 |
| JP | 2004-83811 | * | 3/2004 |
| JP | 2004-083811 | A | 3/2004 |
| JP | 2005-329405 | | 12/2005 |
| JP | 2005-334758 | A | 12/2005 |
| JP | 2006-169497 | | 6/2006 |
| JP | 2008-055407 | | 3/2008 |
| JP | 2008-237949 | | 10/2008 |
| JP | 2005334758 | * | 12/2008 |
| WO | WO 93/05960 A1 | | 4/1993 |
| WO | 95/29950 | | 11/1995 |
| WO | WO 96/20040 A1 | | 7/1996 |
| WO | WO 2007/032312 | * | 3/2007 |
| WO | 2009/011315 | | 1/2009 |

* cited by examiner

WATER-PROOF SOUND-TRANSMITTING MEMBRANE, METHOD FOR PRODUCING WATER-PROOF SOUND-TRANSMITTING MEMBRANE, AND ELECTRICAL APPLIANCE USING THE MEMBRANE

TECHNICAL FIELD

The present invention relates to a water-proof sound-transmitting membrane for electrical appliances with a sound function, and a method for producing the membrane. The present invention also relates to an electrical appliance using the water-proof sound-transmitting membrane.

BACKGROUND ART

Electrical appliances, such as cellular phones, notebook computers, electronic notebooks, and digital cameras, are desired to have a water-proof function because they often are used outdoors. Parts that are most difficult to be provided with the water-proof function are sound emitting parts and sound receiving parts, such as a speaker, a microphone, and a buzzer. Generally, a housing of the electrical appliance with the sound function has openings at positions corresponding to the sound emitting part and the sound receiving part.

A water-proof sound-transmitting membrane is known as a member for preventing water and dust from entering the housing through the openings provided for the sound emitting part and the sound receiving part while ensuring a satisfactory sound transmittance. The water-proof sound-transmitting membrane is a thin film made of a material that hardly hinders the transmittance of sound.

By closing the openings of the housing with the water-proof sound-transmitting membrane, it is possible to attain both the sound transmittance and the waterproofness. As a material suitable for the water-proof sound-transmitting membrane, a polytetrafluoroethylene (PTFE) porous membrane can be mentioned as described in JP 2004-83811 A.

It is known that the waterproofness of the PTFE porous membrane is enhanced by reducing an average pore size. However, a reduced average pore size increases a surface density and lowers the sound transmittance. In short, the sound transmittance and the waterproofness are in a trade-off relationship. Therefore, it is not easy to enhance the waterproofness without lowering the sound transmittance. Then, in Patent Document 1 to be described below, the average pore size and the surface density are specified in order to attain both the waterproofness and the sound transmittance.

In recent years, the level of the waterproofness required for electrical appliances has become higher every year. Specifically, electrical appliances are required to have a waterproofness of not only a level that allows them to be used in daily lives but also a level that allows them to be immersed in water, and furthermore, a level that allows them to be used at a predetermined depth in water for a certain period of time.

It is not assumed that an electrical appliance using the water-proof sound-transmitting membrane disclosed in JP 2004-83811 A is immersed in water. As a result of a series of intensive studies, the following problems have been found in obtaining a water immersible electrical appliance. When a high water pressure is applied to the water-proof sound-transmitting membrane for a certain period of time or longer, the water pressure stretches the membrane. As a result, micropores of the membrane are deformed, allowing water to permeate through the membrane easily, and the membrane tends to rupture easily. Thus, the strength of the membrane is an important factor in attaining a high waterproofness (water resistance) that allows the membrane to withstand even a certain water pressure. When the surface density of the membrane is increased, the strength of the membrane also is increased, but this is accompanied by a decrease in the sound transmittance as described above.

DISCLOSURE OF THE INVENTION

The present invention is intended to enhance the waterproofness of a water-proof sound-transmitting membrane composed of a PTFE porous membrane with little lowering of the sound transmittance of the membrane.

More specifically, the present invention provides a method for producing a water-proof sound-transmitting membrane, including the steps of:

extrusion-molding a paste containing a PTFE fine powder and a processing aid;

stretching a sheet as a molded product of the paste or a sheet obtained by roll-pressing the molded product of the paste, in a first direction at a lower temperature than a melting point of PTFE;

stacking a plurality of the sheets;

stretching the stacked sheets in a second direction intersecting with the first direction at a lower temperature than the melting point of PTFE; and firing the stacked sheets at a temperature equal to or higher than the melting point of PTFE so that the stacked sheets are integrated with each other by a binding force acting between PTFE matrices, the steps being performed in this order, wherein stretching ratios at which the sheets are stretched in the first direction and the second direction are adjusted so that the water-proof sound-transmitting membrane has a surface density of 1 to 20 $g/m^2$.

In another aspect, the present invention provides a method for producing a water-proof sound-transmitting membrane, including the steps of:

extrusion-molding a paste containing a polytetrafluoroethylene fine powder and a processing aid;

stretching biaxially a sheet as a molded product of the paste or a sheet obtained by roll-pressing the molded product of the paste, at a lower temperature than a melting point of polytetrafluoroethylene;

stacking a plurality of the sheets; and firing the stacked sheets at a temperature equal to or higher than the melting point of polytetrafluoroethylene so that the stacked sheets are integrated with each other by a binding force acting between polytetrafluoroethylene matrices, the steps being performed in this order, wherein stretching ratios of the sheets are adjusted so that the water-proof sound-transmitting membrane has a surface density of 1 to 20 $g/m^2$.

The above-mentioned methods make it possible to provide a water-proof sound-transmitting membrane including a PTFE porous membrane. The PTFE porous membrane includes a first porous layer, and a second porous layer stacked on and integrated with the first porous layer by a binding force acting between PTFE matrices. The water-proof sound-transmitting membrane has a surface density of 1 to 20 $g/m^2$.

As described above, it is important to increase the strength of the membrane in order to enhance the waterproofness (water resistance) of the water-proof sound-transmitting membrane. As a method for increasing the strength of the membrane, a stretching ratio is increased. This is because in the PTFE porous membrane, the orientation of PTFE molecules tends to grow when the stretching ratio increases, leading to a higher matrix strength. Thus, when a comparison is made between a single layer membrane with a low stretching ratio and a multilayer membrane with a high stretching ratio, the latter has a higher strength even when they have the same surface density as each other.

However, the PTFE porous membranes do not always have the same strength even when they have the same surface density and the same stretching ratio as each other. For example, when a comparison is made between a dual-layer membrane obtained by stretching biaxially 200 μm-thick PTFE sheets at a ratio of 10 times×20 times and stacking them, and a single layer membrane obtained by stretching biaxially a 400 μm-thick PTFE sheet at a ratio of 10 times×20 times, it looks as if both of the membranes had the same strength because they have the same thickness and the same stretching ratio as each other. If this is true, there is no advantage in employing intentionally a multilayer structure. However, this is not true because of the following reason.

For example, when a PTFE sheet (unstretched sheet) is obtained by roll-pressing a molded product of a paste, the pressure applied to the molded product of the paste in order to obtain the PTFE sheet with a thickness of 400 μm relatively is lower than the pressure applied to the molded product of the paste in order to obtain the PTFE sheet with a thickness of 200 μm. When the pressure applied to the molded product of the paste is low, a binding force acting between the PTFE particles is reduced, and the strength of the PTFE porous membrane obtained eventually also is reduced. In short, for obtaining the PTFE porous membrane with a high strength, not only the stretching ratio but also the history of pressures applied to the unstretched PTFE sheet are extremely important.

Here, there may be a method in which the design of a die for molding the paste is changed in order to obtain the 400 μm-thick PTFE sheet having the same history of pressures applied as that of the 200 μm-thick PTFE sheet. Extremely speaking, by producing a new die having an opening with an area approximately 2 times larger than before and extruding the paste through this, it is possible to obtain the PTFE sheet with a sufficient thickness even when an increased pressure is applied in a roll-pressing process because use of the die increases the thickness of the molded product that has not been roll-pressed yet. However, this is not realistic because the design change of the die needs a high equipment cost and requires changing the conditions for all the processes.

The same problem is observed also in the case where the roll-pressing is not performed, for example, in the case where the paste is extrusion-molded into a sheet shape by using a T-slot die.

For the reasons mentioned above, in order to ensure the strength of the membrane under the condition that the surface density is 1 to 20 g/m$^2$, it is recommended to employ a method in which the PTFE sheet is multilayered as in the present invention. The present invention allows the existing production facilities to be utilized as they are, and thereby the present invention makes it possible to provide the water-proof sound-transmitting membrane having both of an excellent sound transmittance and an excellent waterproofness almost without increasing the production cost.

BEST MODE FOR CARRYING OUT THE INVENTION

Figure 1A:
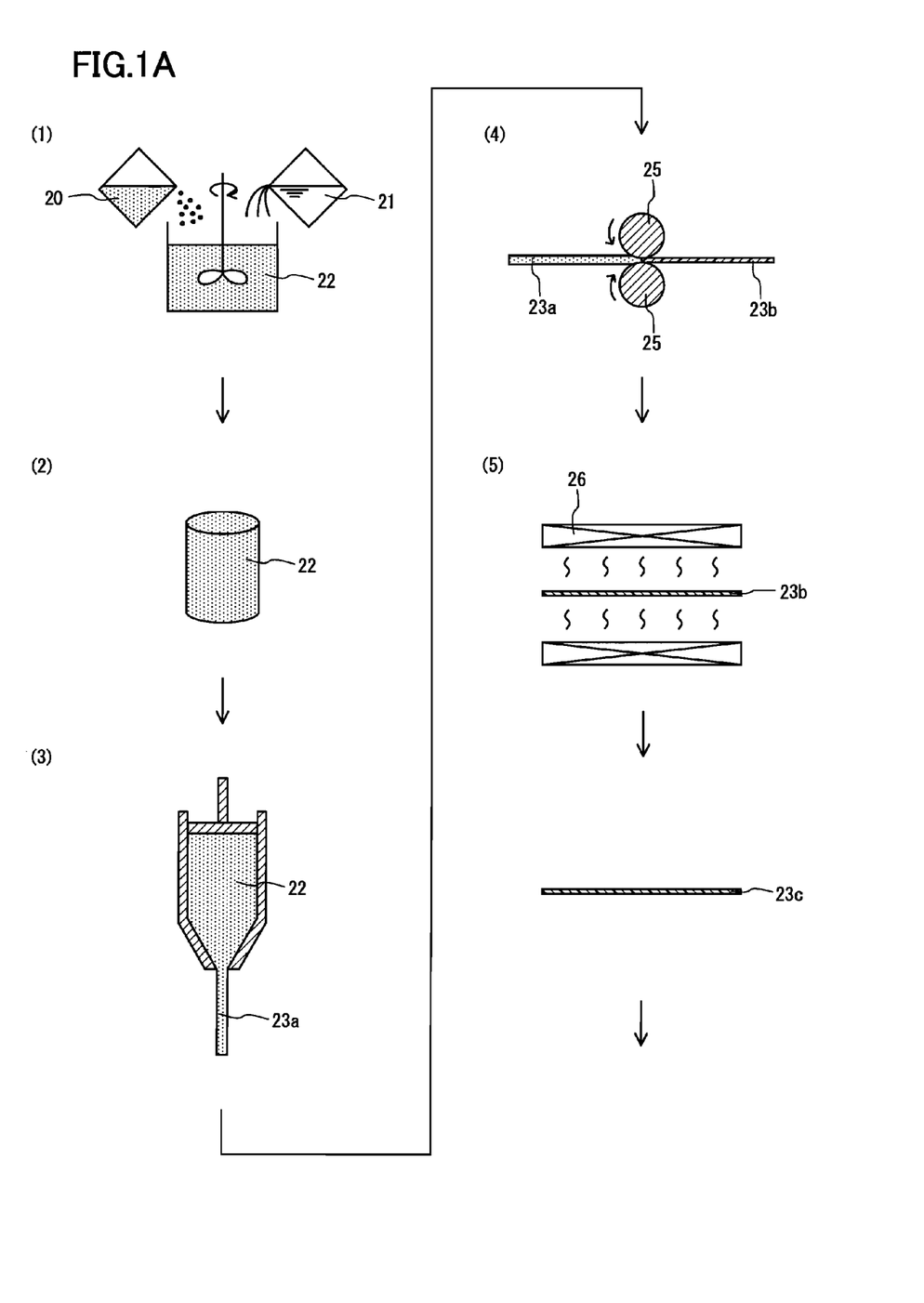
FIG. 1A is a process diagram illustrating a method for producing a water-proof sound-transmitting membrane according to an embodiment of the present invention.
Figure 1B:
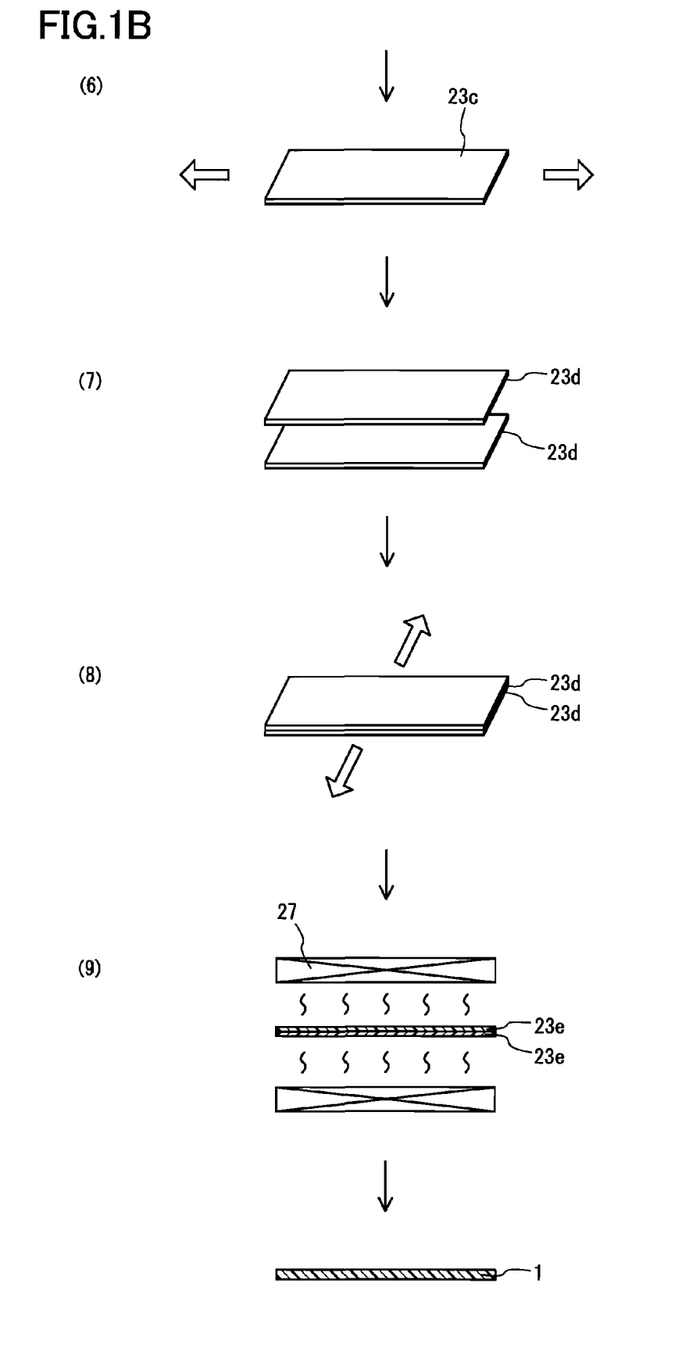
FIG. 1B is a process diagram illustrating a process following FIG. 1A.

Hereinafter, embodiments of the present invention will be described with reference to the drawings. FIG. 1 is a process diagram illustrating the method for producing the waterproof sound-transmitting membrane according to the present embodiment.

(1) Paste Preparation Process

First, a mixture containing a PTFE fine powder 20 and a processing aid 21 (a liquid lubrication agent) in a specified amount is kneaded sufficiently to prepare a paste 22 to be extrusion-molded. The PTFE fine powder 20 may be a commercially-available product produced by a known method such as an emulsion polymerization method. The PTFE fine powder 20 has an average particle diameter of 0.2 μm to 1.0 μm, for example. As the processing aid 21, an organic solvent, such as naphtha and liquid paraffin, can be used. The mixing ratio of the PTFE fine powder 20 and the processing aid 21 may be determined so that the content of the processing aid 21 is 15 to 30 parts by mass with respect to 100 parts by mass of the PTFE fine powder 20.

(2) Preforming Process

Next, the paste 22 containing the PTFE fine powder and the processing aid is preformed into a circular cylindrical shape. It is recommended that the preforming is preformed while a pressure of approximately 10 to 30 kg/cm$^2$ is being applied to the paste 22. Applying a sufficient pressure compresses voids (airspaces) in the paste and stabilizes properties of the paste.

(3) Extrusion Molding Process

Next, the preformed paste 22 is molded by a known extrusion method to obtain a molded product 23$a$ with a sheet shape or a rod shape.

(4) Roll-Pressing Process

Subsequently, the molded product 23$a$ with a sheet shape or a rod shape is roll-pressed to obtain a strip-shaped PTFE sheet 23$b$. At this point, the PTFE sheet 23$b$ has a thickness of 0.1 mm to 1.0 mm, for example. In the roll-pressing process, it is recommended to apply a sufficient pressure to the molded product 23$a$ with a sheet shape or a rod shape. Specifically, it is recommended to adjust a clearance between pressure rolls 25 and 25 so that a stretching ratio represented by (an area of the molded product 23a after being roll-pressed)/(an area of the molded product 23a before being roll-pressed) is 3 to 30 (or 5 to 20). By doing so, the binding force acting between the PTFE particles is increased and the PTFE porous membrane obtained eventually has a higher strength.

When the molded product 23a before being roll-pressed is of a sheet shape, it also is possible to omit the roll-pressing process. More specifically, it also is possible to dry the molded product 23a that has been molded into a sheet shape by the extrusion method and stretch it without roll-pressing.

(5) Drying Process

Next, the roll-pressed PTFE sheet 23b is dried in a dryer 26. The ambient temperature of the dryer 26 is maintained at a temperature lower than the melting point of PTFE, for example, at 50° C. to 200° C. The drying process volatilizes the processing aid and makes it possible to obtain a PTFE sheet 23c in which the content of the processing aid has been reduced sufficiently.

(6) First Stretching Process

Next, the dried PTFE sheet 23c is stretched in a longitudinal direction (MD) as shown in FIG. 1B. The stretching ratio in the longitudinal direction is 3 times to 30 times, for example, and may be 5 times to 20 times. Increasing the stretching ratio in the longitudinal direction to this level makes it possible to encourage sufficiently the orientation of PTFE molecules. As a result, the strength of the PTFE porous membrane can be increased. The first stretching process can be performed at a temperature that allows the PTFE sheet 23c to exhibit a sufficient flexibility and that is lower than the melting point of PTFE, for example, at 150° C. to 300° C. Specifically, the first stretching process can be performed in the dryer 26 used in the drying process shown in FIG. 1A.

(7) Stacking Process

Next, two of PTFE sheets 23d and 23d that have been stretched in the longitudinal direction are stacked. It is recommended to perform the stacking in such a manner that the transportation route of one of the PTFE sheets 23d joins the transportation route of the other PTFE sheet 23d. This allows the two PTFE sheets 23d and 23d to be stacked while being aligned in the longitudinal direction. Thus, it is not necessary to cut the PTFE sheet 23d to be stacked, and thereby an excellent productivity is achieved. Here, the number of the PTFE sheets 23d to be stacked can be determined in a range that does not complicate the process.

As described above, the strength of the PTFE porous membrane varies depending on the history of pressures applied to the unstretched PTFE sheet and the stretching ratio. In order to obtain the PTFE sheet 23b that has been roll-pressed with a higher pressure, the clearance between the pressure rolls 25 and 25 should be narrowed in the roll-pressing process. The narrowed clearance between the pressure rolls 25 and 25 reduces the thickness of the resulting PTFE sheet 23b. Thus, the number of the PTFE sheets 23d to be stacked in the stacking process may be increased so that the surface density needed is ensured eventually. The number of the PTFE sheets 23d to be stacked can be increased also in the case of increasing the stretching ratio. Specifically, as shown in the aftermentioned Examples, the PTFE porous membrane with a 3-layer structure or a 4-layer structure suitably can be used for the water-proof sound-transmitting membrane.

(8) Second Stretching Process

Next, the two PTFE sheets 23d and 23d that have been stacked are stretched in a width direction (TD) intersecting perpendicularly with the longitudinal direction while keeping them in the stacked state. The stretching ratio in the width direction is 3 times to 50 times, for example, and may be 5 times to 30 times. Together with the high stretching ratio in the longitudinal direction, the stretching ratio in the width direction increased to this level makes it possible to increase further the strength of the PTFE porous membrane. The stretching process in the width direction can be performed by a known tenter method at a lower temperature than the melting point of PTFE, for example at an ambient temperature of 50° C. to 300° C.

(9) Firing Process

Finally, two PTFE sheets 23e and 23e that have been stretched biaxially are fired at a temperature equal to or higher than the melting point of PTFE, for example, at 350° C. to 500° C. (the ambient temperature of the furnace 27). The firing process allows the two PTFE sheets 23e and 23e to be integrated with each other over an entire interface therebetween by the binding force acting between the PTFE matrices. Thereby, a PTFE porous membrane 1 used for the water-proof sound-transmitting membrane can be obtained. The firing process may be performed while the two PTFE sheets 23e and 23e are being pressed, or may be performed by allowing them to contact with a press die or a heat roll.

In the production methods shown in FIG. 1A and FIG. 1B, the stacking process is performed between the first stretching process and the second stretching process. However, the first stretching process and the second stretching process may be performed successively. More specifically, it is possible to stack a plurality of the unstretched PTFE sheets, and then stretch the stacked PTFE sheets biaxially by a known stretching method such as the tenter method.

When the biaxial stretching process is performed after the stacking process, the porous structure may lack uniformity. This is because a tension is applied differently between a portion near the interface between the stacked PTFE sheets and a portion apart from the interface. In contrast, in the present embodiment, the stacking and the stretching in the width direction are performed after micropores are formed by the stretching in the longitudinal direction, so a good-quality porous structure comparable to conventional monolayers can be formed. Moreover, the handleability of the PTFE sheet that has been stretched in the longitudinal direction is higher than that of the unstretched PTFE sheet. Thus, in the present embodiment, the stacking process can be performed accurately, and a problem, such as air bubbles trapped between the sheets, hardly occurs. Furthermore, the unstretched sheets do not adhere to each other easily when being stacked, but the sheets that have been stretched in the longitudinal direction can adhere to each other easily and uniformly.

By performing the stacking process between the stretching process in the longitudinal direction and the stretching process in the width direction as in the present embodiment, it is possible to produce the PTFE porous membrane with two layers whose stretching ratios in the longitudinal direction are different from each other. This particular PTFE porous membrane is effective in products (the water-proof sound-transmitting membranes) that require fine adjustments of the surface density and thickness.

It also is possible to stack a plurality of the PTFE sheets that have been stretched biaxially in advance and integrate them by firing. However, since the PTFE sheets after being stretched in the width direction have a very large area in the actual production process, it may be difficult to stack them in this order.

In contrast, when the stacking is performed before the stretching in the width direction is performed, the stacking is easy because the PTFE sheets have a small width, and defects, such as wrinkles and cracks, hardly occur in the PTFE sheet at the time of stacking. As a result, it is possible to suppress a decrease in the yield due to the addition of the stacking process. As shown in FIG. 1B, in the present embodiment, the stretching in the longitudinal direction is performed before the stacking. Since the longitudinal direction of the PTFE sheet usually is along the roll-pressing direction and the transportation direction, the area expansion in the longitudinal direction does not affect the handleability of the PTFE sheet significantly and hardly tends to raise the difficulty of the stacking.

Figure 2A:
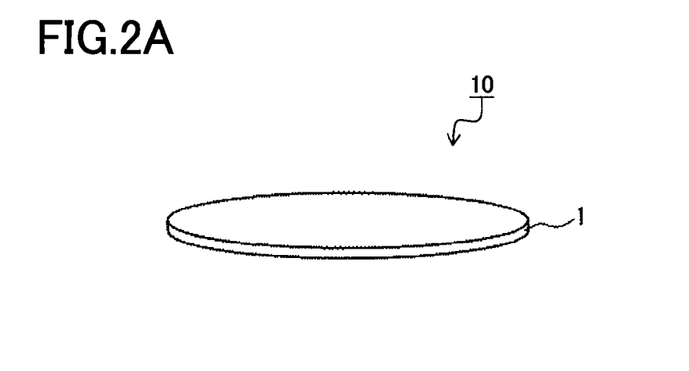
FIG. 2A is a perspective view showing an example of the water-proof sound-transmitting membrane of the present invention.
Figure 2B:
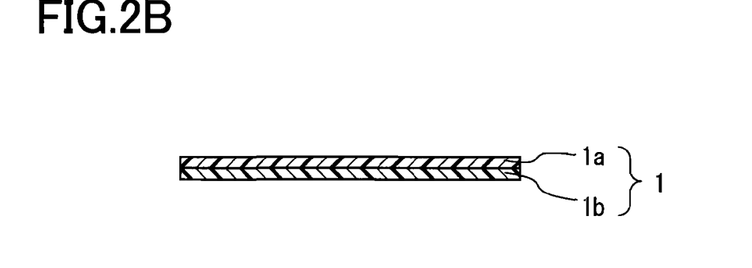
FIG. 2B is a cross-sectional view of the water-proof sound-transmitting membrane of FIG. 1.

A water-proof sound-transmitting membrane 10 shown in FIG. 2A and FIG. 2B can be produced by the above-mentioned method.

The waterproof sound-transmitting membrane 10 shown in FIG. 2A is composed of the PTFE porous membrane 1 with a disk shape. As shown in FIG. 2B, the PTFE porous membrane 1 as the waterproof sound-transmitting membrane 10 includes a first porous layer 1a and a second porous layer 1b. The second porous layer 1b is stacked on and integrated with the first porous layer 1a by the binding force acting between the PTFE matrices. According to the production method described with reference to FIG. 1A and FIG. 1B, the first porous layer 1a has substantially the same matrix structure as that of the second porous layer 1b. In other words, the first porous layer 1a is stretched in stretching directions conforming to those of the second porous layer 1b, respectively, and the stretching ratios at which the first porous layer 1a is stretched are the same, with respect to the respective stretching directions, as the stretching ratios at which the second porous layer 1b is stretched. Moreover, the first porous layer 1a has the same thickness as that of the second porous layer 1b.

The water-proof sound-transmitting membrane 10 has a surface density of 1 to 20 g/m$^2$ (in total of the plurality of layers). The water-proof sound-transmitting membrane 10 with the surface density in such a range has a sufficient physical strength as well as a small sound transmission loss and an excellent sound transmittance. A preferable range for the surface density of the water-proof sound-transmitting membrane 10 is 2 to 10 g/m$^2$.

In order to keep the water pressure resistance of the water-proof sound-transmitting membrane 10 high, the porous layers 1a and 1b constituting the water-proof sound-transmitting membrane 10 preferably have an average pore size of 0.1 µm to 1.0 µm, respectively (it may be 0.7 µm or less, or 0.5 µm or less). A smaller average pore size lowers the gas permeability of the membrane. However, since the water-proof sound-transmitting membrane 10 propagates sound by vibrating itself, the gas permeability does not affect the sound transmittance significantly.

As a method for measuring the average pore size, a measuring method described in ASTM F316-86 generally has been widespread, and automated measuring apparatuses are marketed (Perm-Porometer available from Porous Material Inc., U.S., for example). In this method, the PTFE porous membrane immersed in a fluid with a known surface tension is fixed to a holder and a pressure is applied from one side so as to allow the fluid to come out through the membrane, and then the average pore size is calculated from this pressure. This method is excellent not only because it is simple and has a high reproducibility but also because it can automate the measuring apparatus completely.

Water repellent finishing may be applied to the water-proof sound-transmitting membrane 10 by a water repellent such as fluoropolymer in order to increase water resistance.

Figure 3:
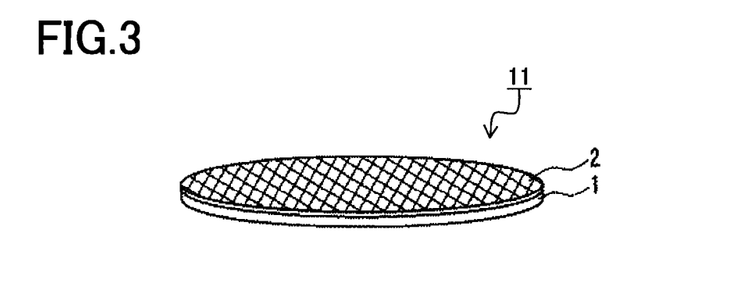
FIG. 3 is a perspective view showing another example of the water-proof sound-transmitting membrane of the present invention.

Next, a water-proof sound-transmitting membrane 11 shown in FIG. 3 includes the PTFE porous membrane 1 and a support body 2 stacked on and integrated with the PTFE porous membrane 1. The support body 2 may be provided on one side or both sides of the PTFE porous membrane 1. The surface density of the waterproof sound-transmitting membrane 11 also is 1 to 20 g/m$^2$, and may be 6 to 20 g/m$^2$. The surface density of the support body 2 is 5 to 19 g/m$^2$, for example, and the thickness of the support body 2 is adjusted so as to obtain such a surface density. The support body 2 may have a circular shape with the same diameter as that of the PTFE porous membrane 1.

As the support body 2, a porous body, such as a net, a foam rubber, and a sponge sheet, nonwoven fabric, woven fabric, etc. can be used. The net particularly is preferable because a net-like material, which also is called a mesh, has a network obtained by combining filaments (fibers), and openings of the network are present at almost the same interval, and thereby the sound transmittance of the PTFE porous membrane hardly is hindered. As the material of the net, a thermoplastic resin, such as polyolefin and polyester, is preferable taking the cost and processability into consideration. Besides these materials, a metal mesh also can be used. The metal mesh functions also as an electromagnetic shielding material for suppressing a microphone and a speaker from receiving a electromagnetic noise.

The method for adhering the PTFE porous membrane 1 to the support body 2 is not particularly limited. When the support body 2 is a net, it is preferable to use a method in which a material with a lower melting point than that of the PTFE porous membrane 1 is used for the net, and a surface of the net is melted by heat lamination so that the PTFE porous membrane 1 partly is impregnated with the melted net. Adhering the PTFE porous membrane 1 to the support body 2 without using an adhesive adds no extra weight, and also can minimize a decrease in the gas permeability that occurs when closing the mesh openings with the adhesive.

Figure 4:
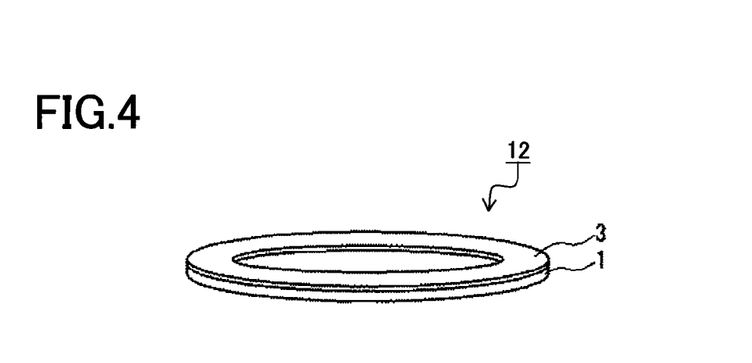
FIG. 4 is a perspective view showing another example of the water-proof sound-transmitting membrane of the present invention.

The support body may be a frame attached around a periphery of the PTFE porous membrane 1. FIG. 4 shows a waterproof sound-transmitting membrane 12 in which a ring-shaped support body 3 is attached around the periphery of the PTFE porous membrane 1. According to the embodiment in which a ring-shaped frame is provided as the support body 3 like this, it is possible to reinforce the PTFE porous membrane 1 in the same manner as the water-proof sound-transmitting membrane 11 shown in FIG. 3, making it easy to handle the PTFE porous membrane 1. Moreover, since the support body 3 serves as an attachment width to the housing of an electrical appliance, the work of attaching to the housing becomes easy. The water-proof sound-transmitting membrane 12 having the ring-shaped support body 3 and the PTFE porous membrane 1 is more advantageous in terms of the sound transmittance than the embodiment in which the net or the like serving as the support body 2 is adhered to the entire surface of the PTFE porous membrane 1 because the sound-transmitting portion of the water-proof sound-transmitting membrane 12 is composed of the single PTFE porous membrane 1. Although the support body 3 is attached around the periphery of the single PTFE porous membrane 1 in the example shown in FIG. 4, it may be attached around a periphery of a stack of the PTFE porous membrane 1 and the sheet-like support body 2.

The material for the supporting material 3 is not particularly limited, and a thermoplastic resin and metal are preferable. As the thermoplastic resin, there can be mentioned polyolefin such as polyethylene (PE) and polypropylene (PP), polyester such as polyethylene terephthalate (PET) and polycarbonate (PC), and polyimide, or a composite of these. As the metal, metal with an excellent corrosion resistance, such as stainless steel and aluminum, can be mentioned. The ring-shaped support body 3 has a thickness of 5 µm to 500 µm, for example, and it may be 25 μm to 200 μm. Preferably, the width of the ring (a difference between an outer diameter and an inner diameter) is 0.5 mm to 2 mm to serve as the attachment width to the housing of the electrical appliance. A foamed material made of the above-mentioned resin also can be used for the ring-shaped support body 3.

The method for adhering the ring-shaped support body 3 to the PTFE porous membrane 1 is not particularly limited. For example, the adhesion may be performed by a method such as heat welding, ultrasonic welding, adhesion with an adhesive, and adhesion with a double-sided tape. Particularly, the double-sided tape preferably is used because it adheres the PTFE porous membrane 1 to the support body 3 easily.

Figure 5A:
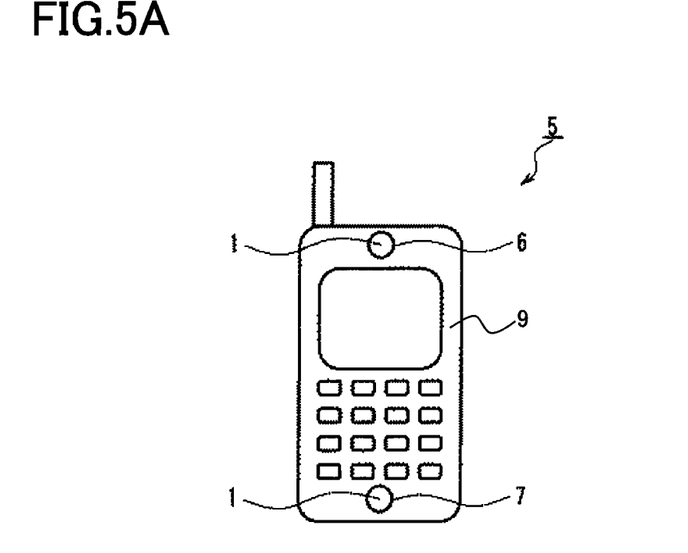
FIG. 5A is a front view of a cellular phone using the water-proof sound-transmitting membrane.
Figure 5B:
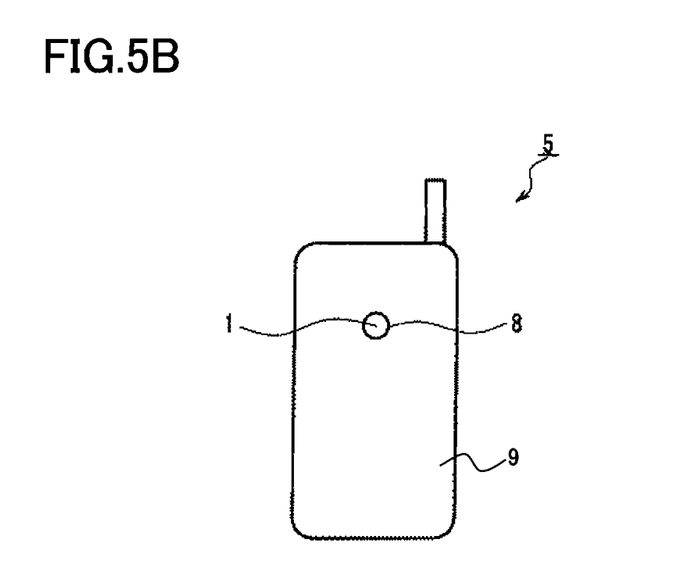
FIG. 5B is a rear view of the cellular phone using the water-proof sound-transmitting membrane.

FIG. 5A and FIG. 5B show an example of an electrical appliance using the water-proof sound-transmitting membrane 10. The electrical appliance shown in FIG. 5A and FIG. 5B is a cellular phone 5. A housing 9 of the cellular phone 5 is provided with openings for a sound emitting part and a sound receiving part, such as a speaker 6, a microphone 7, and a buzzer 8. The water-proof sound-transmitting membrane 10 is attached to the housing 9 from the inside so as to close these openings. This prevents water and dust from entering the housing 9 and protects the sound emitting part and the sound receiving part. The waterproof sound-transmitting membrane 10 is attached to the housing 9 by a method such as adhesion using a double-sided tape, thermal welding, high frequency welding, and ultrasonic welding, so as to prevent water from entering thereinto through a joint portion between the water-proof sound-transmitting membrane 10 and the housing 9.

The water-proof sound-transmitting membrane 10 of the present embodiment is applicable not only to the cellular phone 5 but also to an electrical appliance including at least one selected from a sound emitting part for outputting sound and a sound receiving part for inputting sound. Specifically, the water-proof sound-transmitting membrane 10 of the present embodiment is applicable to various kinds of electrical appliances with a sound function, such as a notebook computer, an electronic notebook, a digital camera, and a portable audio device.

Figure 6A:
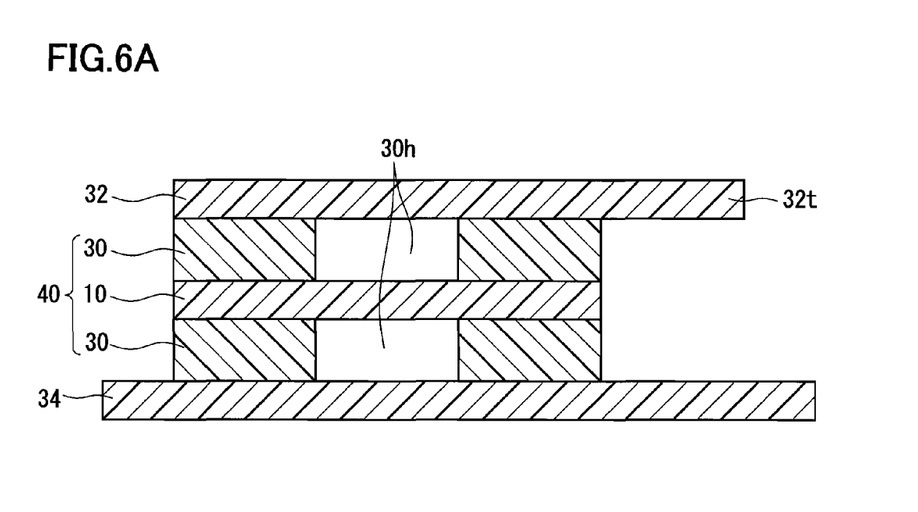
FIG. 6A is a cross-sectional view of the water-proof sound-transmitting membrane held between two separators.

The water-proof sound-transmitting membrane 10 can be provided in the form of an assembly in which a double-sided tape is adhered to each of a front surface and a rear surface of the water-proof sound-transmitting membrane 10. As shown in FIG. 6A, an assembly 40 has the water-proof sound-transmitting membrane 10 and two double-sided tapes 30 each adhered to the front surface and the rear surface of the water-proof sound-transmitting membrane 10. The double-sided tape 30 has the shape of a ring or a frame when viewed in plane. The water-proof sound-transmitting membrane 10 is exposed at opening portions 30h of the double-sided tape 30. A mounting separator 34 is provided on one surface of the assembly 40, and a tabbed separator 32 is provided on another surface of the assembly 40. Since the assembly 40 is held between the two separators 32 and 34, the water-proof sound-transmitting membrane 10 can be protected in a reliable manner and the work of attaching to an adherend, such as a cellular phone, becomes easy.

Figure 6B:
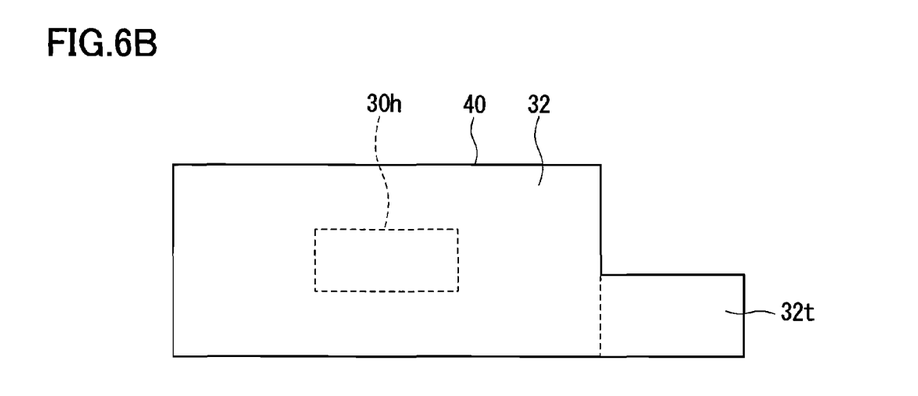
FIG. 6B is a plan view of FIG. 6A.

The separator 32, together with the assembly 40, can be separated from the mounting separator 34. As shown in the plan view of FIG. 6B, a tab 32t of the separator 32 is formed so as to protrude outward from an outer edge of the assembly 40. It is possible to adhere the assembly 40 to the adherend, such as a cellular phone, while holding the tab 32t of the separator 32. The separator 32 easily can be separated from the assembly 40 by pulling the tab 32t. In this way, it is possible to attach the water-proof sound-transmitting membrane 10 to the adherend without touching the water-proof sound-transmitting membrane 10 directly, and thereby the chances of damaging the water-proof sound-transmitting membrane 10 during the attachment work are reduced. The possibility for the adherend to be scratched also can be reduced.

The separators 32 and 34 may be made of a resin, such as polyethylene, polypropylene, and polyethylene terephthalate, or may be made of paper. In the mounting separator 34, a portion to which the assembly 40 is attached may be embossed. It is desirable that an adhesive strength (180° peel adhesive strength) between the tabbed separator 32 and the double-sided tape 30 be higher than an adhesive strength between the mounting separator 34 and the double-sided tape 30. The reason is because this allows the tabbed separator 32 to be separated easily from the mounting separator 34 together with the assembly 40.

The single tabbed separator 32 is provided to the single assembly 40. In contrast, the mounting separator 34 may be shared by a large number of the assemblies 40, or the single mounting separator 34 may be provided to the single assembly 40. The product of the latter case can be obtained by placing the tabbed separator 32 on the assembly 40, and then punching out the mounting separator 34 into a size larger than the tabbed separator 32.

Figure 7A:
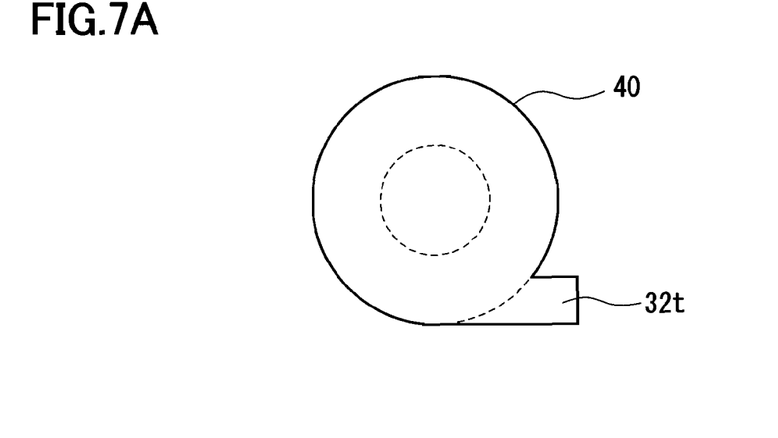
FIG. 7A is a plan view showing other shapes of the separator and the water-proof sound-transmitting membrane.
Figure 7B:
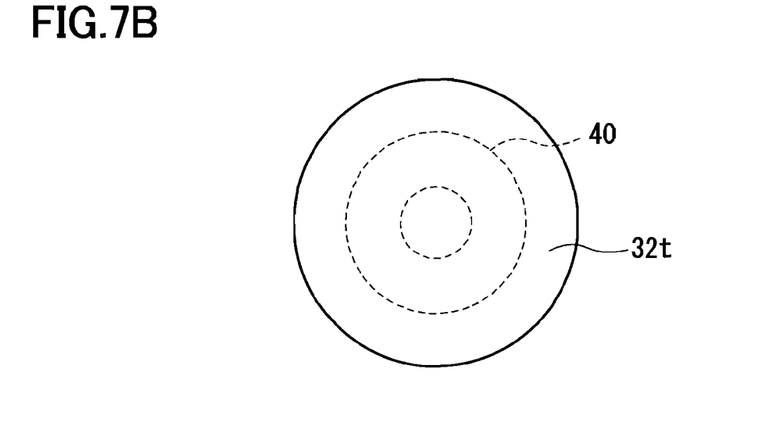
FIG. 7B is a plan view showing still other shapes of the separator and the water-proof sound-transmitting membrane.
Figure 7C:
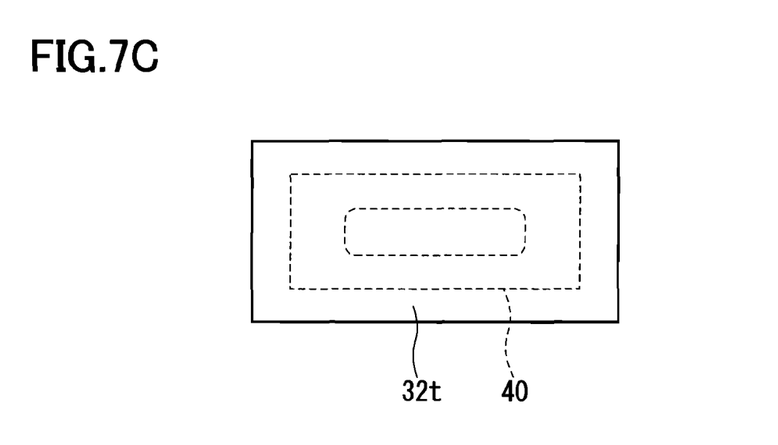
FIG. 7C is a plan view showing still other shapes of the separator and the water-proof sound-transmitting membrane.

The shapes of the assembly 40 and the tabbed separator 32 are not particularly limited. The assembly 40 may be circular as shown in FIG. 7A. The tab 32t may be formed along the entire circumference of the assembly 40 as shown in FIG. 7B. Or, as shown in FIG. 7C, it also is possible that the assembly 40 is rectangular and the tab 32t has the shape of a frame surrounding the assembly 40 when viewed in plane.

EXAMPLES

Hereinafter, the present invention will be described in further detail using examples. The present invention is not limited to these examples.

100 parts by weight of a PTFE fine powder (F101HE produced by Daikin Industries Ltd.) and 20 parts by weight of a liquid lubrication agent (naphtha) were kneaded to prepare a paste containing a PTFE fine powder and naphtha. This paste was preformed into a circular cylindrical at 20 kg/cm$^2$. Next, the circular cylindrical preformed product was extrusion-molded to obtain a rod-shaped molded product (φ47 mm). Subsequently, while containing the liquid lubrication agent, the rod-shaped molded product was made go through between a pair of metal pressure rolls to form a long sheet with a thickness of 200 μm. The long sheet continuously was made pass through a dryer at a temperature of 150° C. so as to stay therein for 5 minutes to remove the liquid lubrication agent by being dried. Thus, the PTFE sheet was produced.

Example 1

The above-mentioned PTFE sheet was stretched 8 times in the longitudinal direction in the dryer at an ambient temperature of 290° C. Furthermore, two of the PTFE sheets that had been stretched in the longitudinal direction were stacked and stretched 31.5 times in the width direction at an ambient temperature of 150° C. by the tenter method. Then, the biaxially-stretched PTFE sheets were fired. Thus, the PTFE porous membrane with a dual-layer structure was obtained.

Examples 2A to 2C

The above-mentioned PTFE sheet was stretched 13 times in the longitudinal direction in the dryer at an ambient temperature of 290° C., and further was stretched 45 times in the width direction at an ambient temperature of 150° C. by the tenter method. Then, three of the biaxially-stretched PTFE sheets were stacked and fired. Thus, the PTFE porous membrane with a three-layer structure was obtained.

Examples 3A and 3B

The above-mentioned PTFE sheet was stretched 13 times in the longitudinal direction in the dryer at an ambient temperature of 290° C., and further was stretched 45 times in the width direction at an ambient temperature of 150° C. by the tenter method. Then, four of the biaxially-stretched PTFE sheets were stacked and fired. Thus, the PTFE porous membrane with a four-layer structure was obtained.

Example 4

As the support body, an olefin net with a low melting point (Delnet X550, surface density 12 g/m$^2$, produced by Del Star Technologies Inc.) was laminated on the PTFE porous membrane of the Example 3A. Thus, the PTFE porous membrane with the support body was obtained.

Example 5

The above-mentioned PTFE sheet was stretched 10 times in the longitudinal direction in the dryer at an ambient temperature of 290° C., and further was stretched 45 times in the width direction at an ambient temperature of 150° C. by the tenter method. Then, three of the biaxially-stretched PTFE sheets were stacked and fired. Thus, the PTFE porous membrane with a three-layer structure was obtained.

Examples 6A to 6C

The above-mentioned PTFE sheet was stretched 8 times in the longitudinal direction in the dryer at an ambient temperature of 290° C., and further was stretched 45 times in the width direction at an ambient temperature of 150° C. by the tenter method. Then, two of the biaxially-stretched PTFE sheets were stacked and fired. Thus, the PTFE porous membrane with a dual-layer structure was obtained.

Comparative Examples 1A to 1E

The above-mentioned PTFE sheet was stretched 4 times in the longitudinal direction in the dryer at an ambient temperature of 290° C., and further was stretched 20 times in the width direction at an ambient temperature of 150° C. by the tenter method. Then, the biaxially-stretched PTFE sheet was fired. Thus, the PTFE porous membrane was obtained.

Comparative Examples 2A to 2C

The above-mentioned PTFE sheet was stretched 6 times in the longitudinal direction in the dryer at an ambient temperature of 290° C., and further was stretched 20 times in the width direction at an ambient temperature of 150° C. by the tenter method. Then, the biaxially-stretched PTFE sheet was fired. Thus, the PTFE porous membrane was obtained.

The Examples and the Comparative Examples each were measured for surface density and water pressure resistance. Table 1 shows the results.

The surface density was obtained as follows. Each of the porous membranes of the Examples and the Comparative Examples was punched with a φ 47 mm punch, and the punched-out portion was measured for mass. Then, the measurement was converted into mass per 1 m$^2$ to use as the surface density.

The water pressure resistance was measured according to a water resistance tester (high water pressure method) described in JIS L 1092. Since use of an area specified in JIS L 1092 deforms the membrane significantly, the measurement was made while suppressing the deformation by placing a stainless steel mesh (with an opening diameter of 2 mm) on a surface of the membrane opposite to a surface to which the pressure was applied.

TABLE 1

| | Stretching ratio | Number of layers stacked | Water pressure resistance (MPa) | Weight (g) | Surface density (g/m$^2$) |
|---|---|---|---|---|---|
| Example 1 | 8 × 31.5 | 2 | 0.48 | 0.0066 | 3.81 |
| Example 2A | 13 × 45 | 3 | 0.53 | 0.0057 | 3.29 |
| Example 2B | 13 × 45 | 3 | 0.53 | 0.0056 | 3.23 |
| Example 2C | 13 × 45 | 3 | 0.52 | 0.0060 | 3.46 |
| Example 3A | 13 × 45 | 4 | 0.58 | 0.0073 | 4.21 |
| Example 3B | 13 × 45 | 4 | 0.6 | 0.0067 | 3.86 |
| Example 4 | 13 × 45 | 4 (with support body) | 0.58 | 0.0278 | 16.03 |
| Example 5 | 10 × 45 | 3 | 0.58 | 0.0066 | 3.81 |
| Example 6A | 8 × 45 | 2 | 0.51 | 0.0069 | 3.98 |
| Example 6B | 8 × 45 | 2 | 0.48 | 0.0068 | 3.92 |
| Example 6C | 8 × 45 | 2 | 0.47 | 0.0065 | 3.75 |
| C. Example 1A | 4 × 20 | 1 | 0.38 | 0.0109 | 6.29 |
| C. Example 1B | 4 × 20 | 1 | 0.47 | 0.0109 | 6.29 |
| C. Example 1C | 4 × 20 | 1 | 0.42 | 0.0109 | 6.29 |
| C. Example 1D | 4 × 20 | 1 | 0.49 | 0.0113 | 6.52 |
| C. Example 1E | 4 × 20 | 1 | 0.42 | 0.0113 | 6.52 |
| C. Example 2A | 6 × 20 | 1 | 0.47 | 0.0070 | 4.04 |
| C. Example 2B | 6 × 20 | 1 | 0.47 | 0.0074 | 4.27 |
| C. Example 2C | 6 × 20 | 1 | 0.46 | 0.0067 | 3.86 |

As shown in Table 1, the Examples, which had a multilayer structure, exhibited a relatively higher water pressure resistance than those of the Comparative Examples even when the Examples had the same level of surface density as those of the Comparative Examples. Furthermore, when a comparison is made between the Examples having the same level of surface density, the one with more layers tends to exhibit a higher water pressure resistance.

(Water Pressure Resistance Holding Test)

Next, a water pressure resistance holding test was conducted on the Example 1, the Example 3A, and the Comparative Example 2A. The water pressure resistance holding test was conducted using the water resistance tester described in JIS L 1092 as in the water pressure resistance test. Specifically, the PTFE porous membrane was applied with a water pressure of 150 kPa (equivalent to a water pressure at a depth of 15 m), held for 1 hour, and then was checked for leakage and evaluated. Since use of an area specified in JIS L 1092 deforms the membrane significantly, the measurement was made while suppressing the deformation by placing a stainless steel mesh (with an opening diameter of 3 mm) on a surface of the membrane opposite to a surface on which the pressure was to be applied.

Table 2 shows the results. The good/bad judgment criteria was as follows.

⊚: No leakage
○: Slight peripheral leakage observed within 30 minutes to 1 hour.
Δ: Peripheral leakage observed within 30 minutes.
×: Ruptured

TABLE 2

|  | Elapsed time | Leakage point | Judgment |
|---|---|---|---|
| Example 1 | 1 hour | Not observed | ⊚ |
|  | 33 minutes | Peripheral leakage | ○ |
|  | 30 minutes | Peripheral leakage | ○ |
|  | 1 hour | Not observed | ⊚ |
|  | 1 hour | Not observed | ⊚ |
| Example 3A | 1 hour | Not observed | ⊚ |
|  | 1 hour | Not observed | ⊚ |
|  | 1 hour | Not observed | ⊚ |
|  | 1 hour | Not observed | ⊚ |
|  | 1 hour | Not observed | ⊚ |
| Comparative Example 2A | 8 minutes and 30 seconds | Ruptured | X |
|  | 9 minutes and 30 seconds | Peripheral leakage | Δ |
|  | 2 minutes and 20 seconds | Peripheral leakage | Δ |
|  | 3 minutes and 30 seconds | Peripheral leakage | Δ |
|  | 28 minutes and 30 seconds | Ruptured | X |

As is apparent from Table 2, the Example 1, the Example 3A, and the Comparative Example 2A showed significantly different results in the water pressure resistance holding test in spite of the fact they all had a surface density around 4 g/m². More specifically, the Examples had a longer water pressure resistance holding time than that of the Comparative Example.

The invention claimed is

1. A water-proof sound-transmitting membrane comprising a polytetrafluoroethylene porous membrane,
wherein the polytetrafluoroethylene porous membrane includes a first porous layer and a second porous layer, each of the first and second porous layers including a polytetrafluoroethylene matrix, the second porous layer being stacked on and integrated with the first porous layer by a binding force acting between the polytetrafluoroethylene matrices,
the water-proof sound-transmitting membrane has a surface density of 2 to 10 g/m²,
the first porous layer and the second porous layer have an average pore size of 1 μm or less, respectively, and the polytetrafluoroethylene porous membrane shows no peripheral leakage within 30 minutes when the polytetrafluoroethylene porous membrane is subjected to a water pressure of 150 kPa.

2. The water-proof sound-transmitting membrane according to claim 1,
wherein the first porous layer and the second porous layer each are stretched biaxially, and
stretching ratios at which the first porous layer is stretched are the same as stretching ratios at which the second porous layer is stretched.

3. The water-proof sound-transmitting membrane according to claim 2, wherein the first porous layer is stretched in stretching directions conforming to those of the second porous layer, respectively, and the stretching ratios at which the first porous layer is stretched are the same, with respect to the respective stretching directions, as the stretching ratios at which the second porous layer is stretched.

4. The water-proof sound-transmitting membrane according to claim 1, further comprising a support body stacked on at least one selected from the first porous layer and the second porous layer.

5. An electrical appliance with a sound function, comprising at least one selected from a sound emitting part for outputting sound and a sound receiving part for inputting sound, and a water-proof sound-transmitting membrane for protecting the sound emitting part and/or the sound receiving part from water and dust,
wherein the water-proof sound-transmitting membrane according to claim 1 is used as the water-proof sound-transmitting membrane.

6. The water-proof sound-transmitting membrane according to claim 1, wherein the average pore size is in the range of 0.1 to 0.5 μm.

7. The water-proof sound-transmitting membrane according to claim 1, wherein the first porous layer and the second porous layer each are a fired layer, and the first porous layer and the second porous layer are stacked before firing to form the fired layers.

* * * * *